US012473617B2

(12) United States Patent
Dudzik et al.

(10) Patent No.: US 12,473,617 B2
(45) Date of Patent: Nov. 18, 2025

(54) CAST IRON, IN PARTICULAR FOR COMPONENTS OF DISC BRAKES

(71) Applicant: Brembo S.p.A, Bergamo (IT)

(72) Inventors: Bozena Dudzik, Bergamo (IT); Mariusz Bieronski, Bergamo (IT); Fabiano Carminati, Bergamo (IT)

(73) Assignee: Brembo S.p.A., Bergamo (IT)

( * ) Notice: Subject to any disclaimer, the term of this patent is extended or adjusted under 35 U.S.C. 154(b) by 568 days.

(21) Appl. No.: 17/628,935

(22) PCT Filed: Jul. 23, 2020

(86) PCT No.: PCT/IB2020/056968

§ 371 (c)(1),
(2) Date: Jan. 21, 2022

(87) PCT Pub. No.: WO2021/014404

PCT Pub. Date: Jan. 28, 2021

(65) Prior Publication Data

US 2022/0251691 A1 Aug. 11, 2022

(30) Foreign Application Priority Data

Jul. 24, 2019 (IT) ........................ 102019000012738

(51) Int. Cl.

| | |
|---|---|
| ***C22C 37/10*** | (2006.01) |
| ***C21C 1/08*** | (2006.01) |
| ***C21D 5/00*** | (2006.01) |
| ***C22C 37/08*** | (2006.01) |
| ***C22C 38/00*** | (2006.01) |
| ***C22C 38/02*** | (2006.01) |
| ***C22C 38/04*** | (2006.01) |
| ***C22C 38/42*** | (2006.01) |
| ***C22C 38/44*** | (2006.01) |
| ***C22C 38/46*** | (2006.01) |
| ***C22C 38/50*** | (2006.01) |
| ***F16D 65/12*** | (2006.01) |

(52) U.S. Cl.

CPC ................ *C22C 37/10* (2013.01); *C21C 1/08* (2013.01); *C21D 5/00* (2013.01); *C22C 37/08* (2013.01); *C22C 38/002* (2013.01); *C22C 38/008* (2013.01); *C22C 38/02* (2013.01); *C22C 38/04* (2013.01); *C22C 38/42* (2013.01); *C22C 38/44* (2013.01); *C22C 38/46* (2013.01); *C22C 38/50* (2013.01); *F16D 65/125* (2013.01); *C21D 2211/003* (2013.01); *C21D 2211/005* (2013.01); *C21D 2211/009* (2013.01); *F16D 2200/0013* (2013.01)

(58) Field of Classification Search

CPC ....... C22C 37/10; C22C 37/08; C22C 38/002; C22C 38/008; C22C 38/02; C22C 38/04; C22C 38/42; C22C 38/44; C22C 38/46; C22C 38/50; C22C 38/08; C22C 38/12; C22C 38/14; C22C 38/22; C22C 38/28; C22C 38/34; C22C 38/36; C22C 38/40; C22C 38/56; C22C 38/58; C21C 1/08; C21D 5/00; C21D 2211/003; C21D 2211/005; C21D 2211/009; F16D 65/125; F16D 2200/0013

See application file for complete search history.

(56) References Cited

U.S. PATENT DOCUMENTS

| | | | |
|---|---|---|---|
| 4,548,643 A | 10/1985 | Betts | |
| 2011/0042051 A1 | 2/2011 | Karlsson et al. | |
| 2025/0059634 A1 * | 2/2025 | Dudzik .................... | C21D 5/00 |

FOREIGN PATENT DOCUMENTS

| | | | | |
|---|---|---|---|---|
| BR | 102017019593 | A2 | * | 4/2019 |
| CN | 102115843 | A | * | 7/2011 |
| CN | 103237911 | A | | 8/2013 |
| CN | 103572149 | A | | 2/2014 |
| CN | 103667861 | A | | 3/2014 |
| CN | 103834852 | A | * | 6/2014 |
| CN | 103938147 | A | * | 7/2014 |
| CN | 104195423 | A | | 12/2014 |
| CN | 107299275 | A | | 10/2017 |
| EP | 0693336 | A2 | | 1/1996 |
| GB | 1500766 | | * | 2/1976 |

(Continued)

OTHER PUBLICATIONS

CN-103938147-A, Ye, machine translation. (Year: 2014).*

(Continued)

*Primary Examiner* — John A Hevey
(74) *Attorney, Agent, or Firm* — Marshall-Melhorn, LLC

(57) ABSTRACT

The invention consists of a gray cast iron comprising carbon, silicon, vanadium, manganese, nickel, chromium, molybdenum, copper, sulfur, phosphorous, tin and titanium, wherein: the percentage by weight of carbon is from 3.70 to 3.90%; the percentage by weight of silicon is from 1.30 to 2.10%; the percentage by weight of vanadium is from 0.10 to 0.15%; the percentage by weight of manganese is from 0.60 to 0.90%; the percentage by weight of nickel is from 0.05 to 0.50%; the percentage by weight of chromium is from 0.20 to 0.35%; the percentage by weight of molybdenum is no more than 0.10%; the percentage by weight of copper is no more than 0.35%; the percentage by weight of sulfur is less than 0.10%; the percentage by weight of phosphorous is less than 0.10%; the percentage by weight of tin is less than 0.10%; the percentage by weight of titanium is no more than 0.01%; the remainder by weight being iron.

1 Claim, No Drawings

(56) References Cited

FOREIGN PATENT DOCUMENTS

| | | | |
|---|---|---|---|
| JP | S5329222 | A | 3/1978 |
| JP | S60138051 | A | 7/1985 |

OTHER PUBLICATIONS

CN-103834852-A, Huang, machine translation. (Year: 2014).*
CN-102115843-A, Luo, machine translation. (Year: 2011).*
BR-102017019593-A2, Dos Santos, machine translation. (Year: 2019).*
European Patent Office, International Search Report and Written Opinion in application No. PCT/IB2020/056968, dated Sep. 30, 2020, 14 pages, Rijswijk Netherlands.
China National Intellectual Property Administration, Search Report in Application No. 202080053404.0 dated Dec. 9, 2022, 13 pages.

* cited by examiner

CAST IRON, IN PARTICULAR FOR COMPONENTS OF DISC BRAKES

FIELD OF APPLICATION

The present invention relates to a cast iron, in particular for making a brake disc, and to a brake disc for a disc brake made with said cast iron.

BACKGROUND ART

As known, brake discs made of gray cast iron are subject to wear at the braking bands over time. Inevitably, such phenomena affect the duration of the discs.

Therefore, the need to manufacture brake discs made of cast iron which have high wear resistance is greatly felt in the automotive field, and in particular for high-performance vehicles.

An increased wear resistance thus results in a reduction of metal powders being released into the environment.

However, the increased wear resistance in discs made of gray cast iron must be achieved taking into account the mechanical and thermal stresses of high intensity to which the brake discs are subjected. Such stresses result in the attainment of high temperatures on the braking bands, which can result in decreases in the braking performance, and even in the formation of cracks on the braking band.

The need is also felt for brake discs made of gray cast iron to have high corrosion resistance so as to increase the duration thereof. Therefore, increased wear resistance must not have a negative impact on the corrosion resistance.

In the art, gray cast iron solutions capable of simultaneously combining high wear resistance with high performance in terms of mechanical resistance, heat resistance, and corrosion resistance are not known.

PRESENTATION OF THE INVENTION

It is the object of the present invention to provide a gray cast iron which overcomes the drawbacks stated with reference to the prior art.

Such drawbacks are overcome by a gray cast iron according to claim 1.

Other embodiments of the cast iron according to the invention are described in the following claims.

Further features and advantages of the present invention will become more apparent from the description given below of preferred, non-limiting embodiments thereof.

DETAILED DESCRIPTION

According to a general embodiment, the gray cast iron of the present invention comprises in the alloy: carbon, silicon, vanadium, manganese, nickel, chromium, molybdenum, copper, sulfur, phosphorous, tin and titanium.

Such alloying elements are contained in the cast iron with the following ranges of percentage by weight on the total weight of the cast iron:

carbon from 3.70 to 3.90% by weight,
silicon from 1.30 to 2.10% by weight,
vanadium from 0.10 to 0.15% by weight,
manganese from 0.60 to 0.90% by weight,
nickel from 0.05 to 0.50% by weight,
chromium from 0.20 to 0.35% by weight,
molybdenum no more than 0.10% by weight,
copper no more than 0.35% by weight,
sulfur less than 0.10% by weight,
phosphorus less than 0.10% by weight,
tin less than 0.10% by weight,
titanium no more than 0.01% by weight, the remainder by weight being iron.

Preferably, the percentage by weight of carbon is from 3.70, 3.86%,

Preferably, the percentage by weight of silicon is from 1.40 to 2.08%,

Preferably, the percentage by weight of vanadium is from 0.12 to 0.14%,

Preferably, the percentage by weight of manganese is from 0.63 to 0.85%,

Preferably, the percentage by weight of nickel is from 0.06 to 0.47%.

Preferably, the percentage by weight of chromium is from 0.21 to 0.35%,

Preferably, the percentage by weight of copper is from 0.19 to 0.35%,

Preferably, the percentage by weight of tin is no more than 0.09%,

Preferably, the percentage by weight of titanium is from 0.0079 to 0.01%.

According to a first preferred embodiment, the gray cast iron has the following composition:

3.86% by weight carbon;
1.85% by weight silicon;
0.12% by weight vanadium;
0.63% by weight manganese;
0.06% by weight nickel;
0.21% by weight chromium;
0.002% by weight molybdenum;
0.19% by weight copper;
0.065% by weight sulfur;
0.04% by weight phosphorous;
0.023% by weight tin;
0.0079% by weight titanium;

the remainder by weight being iron.

According to a second preferred embodiment, the gray cast iron has the following composition:

3.70% by weight carbon;
2.08% by weight silicon;
0.12% by weight vanadium;
0.658% by weight manganese;
0.47% by weight nickel;
0.255% by weight chromium;
0.0312% by weight molybdenum;
0.238% by weight copper;
0.0463% by weight sulfur;
0.031% by weight phosphorous;
0.038% by weight tin;
0.01% by weight titanium;

the remainder by weight being iron.

Advantageously, the gray cast iron can additionally comprise tungsten, with a percentage by weight from 0.10 to 0.14%, and preferably equal to 0.12%.

According to a third particularly preferred embodiment, the gray cast iron has the following composition:

3.75% by weight carbon,
1.40% by weight silicon,
0.14% by weight vanadium;
0.12% by weight tungsten,
0.85% by weight manganese,
0.1% by weight nickel,
0.35% by weight chrome,
0.1% by weight molybdenum,
0.35% by weight copper,
<0.1% by weight sulfur, <0.1% by weight phosphorous, 0.09% by weight tin, 0.01% by weight titanium the remainder by weight being iron.

Preferably, the ferrous matrix of the cast iron is of the pearlite or fine lamellar type. In particular, the percentage by weight of pearlite on the weight of the ferrous matrix is no less than 95%.

Preferably, the gray cast iron comprises ferrite with a percentage by weight of less than 5% on the weight of the ferrous matrix. Even more preferably, the percentage by weight of ferrite on the weight of the ferrous matrix is equal to 1%.

In particular, the gray cast iron comprises cementite and free carbides with a percentage by weight of no more than 1% on the weight of the ferrous matrix.

Advantageously, the cast iron of the present invention can be used to produce components of disc brakes.

For example, the cast iron can be used to produce at least one braking band of a brake disc for a disc brake of any type.

Experimental wear tests have been carried out, comparing a brake disc made of a gray cast iron of a standard composition to three brake discs made of three cast irons, having three different compositions falling within the present invention.

COMPARATIVE EXAMPLE

A brake disc was obtained with a gray cast iron having the following composition: 3.74 by weight carbon; 1.65% by weight silicon; 0.55% by weight manganese; 0.1% by weight nickel; 0.15% by weight chromium; 0.1% by weight molybdenum; 0.2% by weight copper; <0.1% by weight sulfur; <0.08% by weight phosphorus; 0.023% by weight tin; 0.09% by weight titanium; the remainder by weight being iron.

The ferrous matrix consists of 1% by weight ferrite, 98.5% by weight pearlite and 0.5% by weight carbides.

The brake disc made of such a gray cast iron will be referred to as COMPARATIVE DISC below.

Example 1

A first brake disc was obtained, identical to the comparative disc, but using a gray cast iron according to the invention, having the following first composition: 3.86% by weight carbon; 1.85 by weight silicon; 0.12% by weight vanadium; 0.63% by weight manganese; 0.06% by weight nickel; 0.21% by weight chromium; 0.002% by weight molybdenum; 0.19% by weight copper; 0.065% by weight sulfur; 0.04% by weight phosphorus; 0.023% by weight tin; 0.0079% by weight titanium; the remainder by weight being iron.

The ferrous matrix consists of 1% by weight ferrite, 98% by weight pearlite and 1% by weight carbides.

The brake disc made of such a gray cast iron will be referred to as DISC 1 below.

Example 2

A second brake disc was obtained, identical to the comparative disc, but using a gray cast iron according to the invention, having the following second composition: 3.70% by weight carbon; 2.08% by weight silicon; 0.12% by weight vanadium; 0.658% by weight manganese; 0.47% by weight nickel; 0.255% by weight chromium; 0.0312% by weight molybdenum; 0.238% by weight copper; 0.0463% by weight sulfur; 0.031% by weight phosphorus; 0.038% by weight tin; 0.01% by weight titanium; the remainder by weight being iron.

The ferrous matrix consists of 1% by weight ferrite, 98% by weight pearlite and 1% by weight carbides.

The brake disc made of such a gray cast iron will be referred to as DISC 2 below.

Example 3

A third brake disc was obtained, identical to the comparative disc, but using a gray cast iron according to the invention, having the following third composition: 3.75% by weight carbon; 1.40% by weight silicon; 0.14% by weight vanadium; 0.12% by weight tungsten; 0.85% by weight manganese; 0.1% by weight nickel; 0.35% by weight chromium; 0.1% by weight molybdenum; 0.35% by weight copper; <0.1% by weight sulfur; <0.1% by weight phosphorus; 0.09% by weight tin and 0.01% by weight titanium; the remainder by weight being iron.

The ferrous matrix consists of about 1% by weight ferrite, 97.5% by weight pearlite and <1% by weight carbides.

The brake disc made of such a gray cast iron will be referred to as DISC 3 below.

Experimental Tests

The comparative brake disc and the three brake discs according to the invention (DISC 1, 2 and 3) were subjected to five repetitions of a well-known technical test in the field of braking systems. At the end of such a test, it emerged that the reduction in weight loss of the three discs is from 50÷55% as compared to the reference disc.

It emerges from such tests that, under equal conditions, the brake discs according to the invention (disc 1, 2 and 3) experienced a significantly smaller weight loss than that experienced by the comparative disc. On average, the brake discs according to the invention (disc 1, 2 and 3) had a weight loss of less than 50% as compared to that of the comparative disc.

This means that the gray cast irons according to the invention offer a greater wear resistance than the standard gray cast iron taken as reference.

From an analysis of the test results, it also emerges that disc 3 had a more marked reduction in weight loss than the comparative disc. From this it follows that the gray cast iron used to make such a disc 3 allows to obtain a more marked wear resistance.

The same brake discs (comparative disc, disc 1, disc 2 and disc 3) were further characterized from a mechanical point of view and of the functional parameters.

The results are shown in Table 1:

TABLE 1

| | COMPARATIVE DISC | DISC 1 | DISC 2 | DISC 3 |
|---|---|---|---|---|
| Tensile strength Rm [MPa] | 190 | 182 | 165 | 273 |
| Hardness [HBW] | 180-186 | 187-190 | 183-185 | 234 |
| Density [kg/dm$^3$] | 7.1 | 7.1 | 7.1 | 7.3 |
| Corrosion [% loss by weight] | 0.29 | 0.21 | 0.23 | 0.17 |

From a comparison of the data shown in Table 1, it emerges that, in terms of mechanical resistance, heat resistance and corrosion resistance, the performance of discs 1, 2 and 3 is substantially comparable to that of the brake disc created using a standard gray cast iron.

All this is also indirectly confirmed by the fact that, with respect to the standard gray cast iron used to make the comparative disc, the gray cast iron according to the invention does not involve any significant change in the percentages by weight of carbon (graphite), silicon, and in the sum of the percentages by weight of chromium and molybdenum.

The large amount of carbon (graphite) ensures that the cast iron according to the invention has a high thermal conductivity, which allows a high heat exchange during the braking shocks. Thereby, the risk of cracking due to thermal stress is significantly reduced, even after a heavy use of the braking system. The cast iron of the present invention also has a high damping capacity which contributes to increasing the resistance to the formation and spreading of cracks.

Due to the percentages of silicon included in the cast iron of the present invention, a graphitizing effect is achieved, preventing the formation of cementite and carbides.

Furthermore, chromium and molybdenum stabilize the formation of lamellar pearlite in the metal matrix.

At the end of the five repetitions of the standard test used during the design of suitable brake discs for the braking systems, the weight losses of the pads used in association with the comparative disc and with discs 1, 2 and 3 were then also measured.

From a data comparison, it emerges that discs 1, 2 and 3 cause a wear on the pads, which is substantially comparable to that caused by the comparative disc. Thus, the increase in the wear resistance does not cause an increase in the wear of the pads associated with the disc made using the cast iron according to the invention.

As can be appreciated from the description, the gray cast iron of the present invention allows the drawbacks presented in the prior art to be overcome.

In particular, the cast iron according to the present invention and the related brake discs made of said cast iron offer a significantly greater wear resistance than the standard gray cast iron, taken as reference. Such an increase does not result in a deterioration of mechanical resistance, heat resistance, and corrosion resistance.

In fact, the performance of brake discs made of the gray cast iron according to the invention is comparable to that of the brake disc made of a standard gray cast iron in terms of mechanical resistance, heat resistance, and corrosion resistance.

It also emerged that the increase in wear resistance ensured by the gray cast iron according to the invention does not significantly alter the wear of the pads either. In fact, from the data deriving from the weight losses, it emerges that the pads associated with discs 1, 2 and 3 were substantially worn in a similar manner (in terms of weight loss) to those associated with the comparative disc. In particular, compared to the comparative disc, there is indeed a reduction in the wear of the pads in the case of disc 3.

In order to meet specific, contingent needs, those skilled in the art can make several changes and variations to the cast irons and brake disc described above, all contained in the scope of the invention as defined by the following claims.

The invention claimed is:

1. A grey cast iron consisting of carbon, silicon, vanadium, tungsten, manganese, nickel, chromium, molybdenum, copper, sulphur, phosphorus, tin, titanium, and iron, wherein the percentage by weight of carbon is 3.75%,
the percentage by weight of silicon is 1.40%,
the percentage by weight of vanadium is 0.14%,
the percentage by weight of tungsten is 0.12%,
the percentage by weight of manganese is 0.85%,
the percentage by weight of nickel is 0.01%,
the percentage by weight of chromium is 0.35%,
the percentage by weight of molybdenum is 0.1%,
the percentage by weight of copper is 0.35%,
the percentage by weight of sulphur is <0.1%,
the percentage by weight of phosphorus is <0.1%,
the percentage by weight of tin is 0.09%,
the percentage by weight of titanium is 0.01%, and
the remainder by weight being constituted by iron.

* * * * *